United States Patent
Linzmeier et al.

Patent Number: 6,058,449
Date of Patent: May 2, 2000

[54] FAULT TOLERANT SERIAL ARBITRATION SYSTEM

[75] Inventors: Daniel Linzmeier, Wheeling; Kevin L. Kloker, Palatine, both of Ill.

[73] Assignee: Motorola, Inc., Schaumburg, Ill.

[21] Appl. No.: 08/904,029

[22] Filed: Jul. 31, 1997

[51] Int. Cl.[7] ................................................. G06F 13/20
[52] U.S. Cl. ........................ 710/107; 710/40; 710/240; 710/244
[58] Field of Search .................... 395/287, 290, 395/306, 733, 728, 732, 737, 296, 303, 860; 710/107, 110, 126, 116, 123, 40, 260, 240, 244, 264, 241, 242, 243

[56] References Cited

U.S. PATENT DOCUMENTS

| | | | |
|---|---|---|---|
| 4,439,873 | 4/1984 | Gunter et al. | 364/200 |
| 4,488,218 | 12/1984 | Grimes | 395/296 |
| 4,726,018 | 2/1988 | Bux et al. | 370/89 |
| 4,785,453 | 11/1988 | Chandran et al. | 371/68 |
| 5,132,967 | 7/1992 | Kalajainen et al. | 370/85.2 |
| 5,138,709 | 8/1992 | Jones et al. | 395/575 |
| 5,146,596 | 9/1992 | Whittaker et al. | 395/725 |
| 5,307,466 | 4/1994 | Chang | 395/325 |
| 5,377,332 | 12/1994 | Entwistle et al. | 395/325 |
| 5,388,074 | 2/1995 | Buckenmaier | 365/189.05 |
| 5,388,223 | 2/1995 | Guthrie et al. | 395/325 |
| 5,410,710 | 4/1995 | Sarangdhar et al. | 395/725 |
| 5,424,850 | 6/1995 | Inoue et al. | 358/341 |
| 5,437,019 | 7/1995 | Brockmann | 395/400 |
| 5,459,840 | 10/1995 | Isfeld et al. | 395/309 |
| 5,515,516 | 5/1996 | Fisch et al. | 395/294 |
| 5,517,514 | 5/1996 | Norrie et al. | 371/49.1 |
| 5,553,022 | 9/1996 | Weng et al. | 365/189.01 |
| 5,581,790 | 12/1996 | Sefidvash | 395/854 |
| 5,710,549 | 1/1998 | Horst et al. | 340/825.5 |
| 5,740,286 | 4/1998 | Esashi | 382/312 |
| 5,802,057 | 9/1998 | Duckwall et al. | 370/408 |

*Primary Examiner*—Ayaz R. Sheikh
*Assistant Examiner*—Ario Etienne

[57] ABSTRACT

A serial arbitration system utilizes an arbitration token containing a start bit, a request bit, a set of priority bits, and an error detection bit. The arbitration token is sent to each of the other processors (20, 21, 22) and is used to arbitrate control of a shared bus (38). A processor indicates that it is the master (20) by setting the start bit (120). It enters an arbitration by setting the request bit (124). The set of priority bits (134) contains a binary priority value encoded in bit major order. This format allows an optimized parallel comparison (128, 130) of the priority values for each of the requesting processors a bit at a time. Finally, processors drop out of the arbitration upon detecting (136) a parity error in an arbitration token received from another processor.

26 Claims, 9 Drawing Sheets

FAULT TOLERANT SERIAL ARBITRATION SYSTEM

CROSS REFERENCE TO RELATED APPLICATION

This application is related to our copending patent application entitled "LOW POWER SERIAL ARBITRATION SYSTEM", filed of even date herewith and assigned to the assignee hereof.

FIELD OF THE INVENTION

The present invention generally relates to bus arbitration, and more specifically to a serial arbitration system applicable for low power applications.

BACKGROUND OF THE INVENTION

Many serial arbitration techniques use an open pull-down collector configuration to arbitrate between a number of devices. FIG. 2 is a block diagram that illustrates such a prior art serial arbitration system. Three processors 0 50, 1 51, and 2 52 are coupled via a common bus 54 with an open collector resistor 55. The bus is pulled up with a pull-up transistor 56 controlled by a pre-charge line 57 and it is pulled down with a pull-down transistor 58 controlled by an ARB signal 59. In order to minimize the chance of shorts, only the master processor 50 operates the pull-up transistor 56, while all processors 50, 51, 52 operate pull-down transistors 58.

In portable multi-processor systems, such as portable multi-media devices, battery lifetime is a primary concern. The need to use open collector resistor 55 increases power consumption. Indeed, the system draws static power, even when not operational. The result is that this sort of arbitration system draws too much current to be used in battery operated systems.

The system shown in FIG. 2 also has some other problems. First, it does not support dynamic priority levels without significant modifications. Even then, it does not break priority level ties. Finally, it cannot detect and properly handle the situation where errors occur during the priority arbitration phase.

BRIEF DESCRIPTION OF THE DRAWINGS

The features and advantages of the present invention will be more clearly understood from the following detailed description taken in conjunction with the accompanying FIGS. where like numerals refer to like and corresponding parts and in which.

DETAILED DESCRIPTION

The terms "assert", "assertion", "negate", and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false. In addition, the terms "set" and "clear" will be used when referring to the rendering of a status bit or similar apparatus into its logically true or logically false state, respectively. Note that in many cases, whether a given signal is asserted or negated in any given situation is an implementation decision well known in the art. This invention envisions alternate implementations. The term "bus" will be used to refer to a plurality of signals or conductors which may be used to transfer one or more various types of information, such as data, addresses, control, or status.

Figure 1:
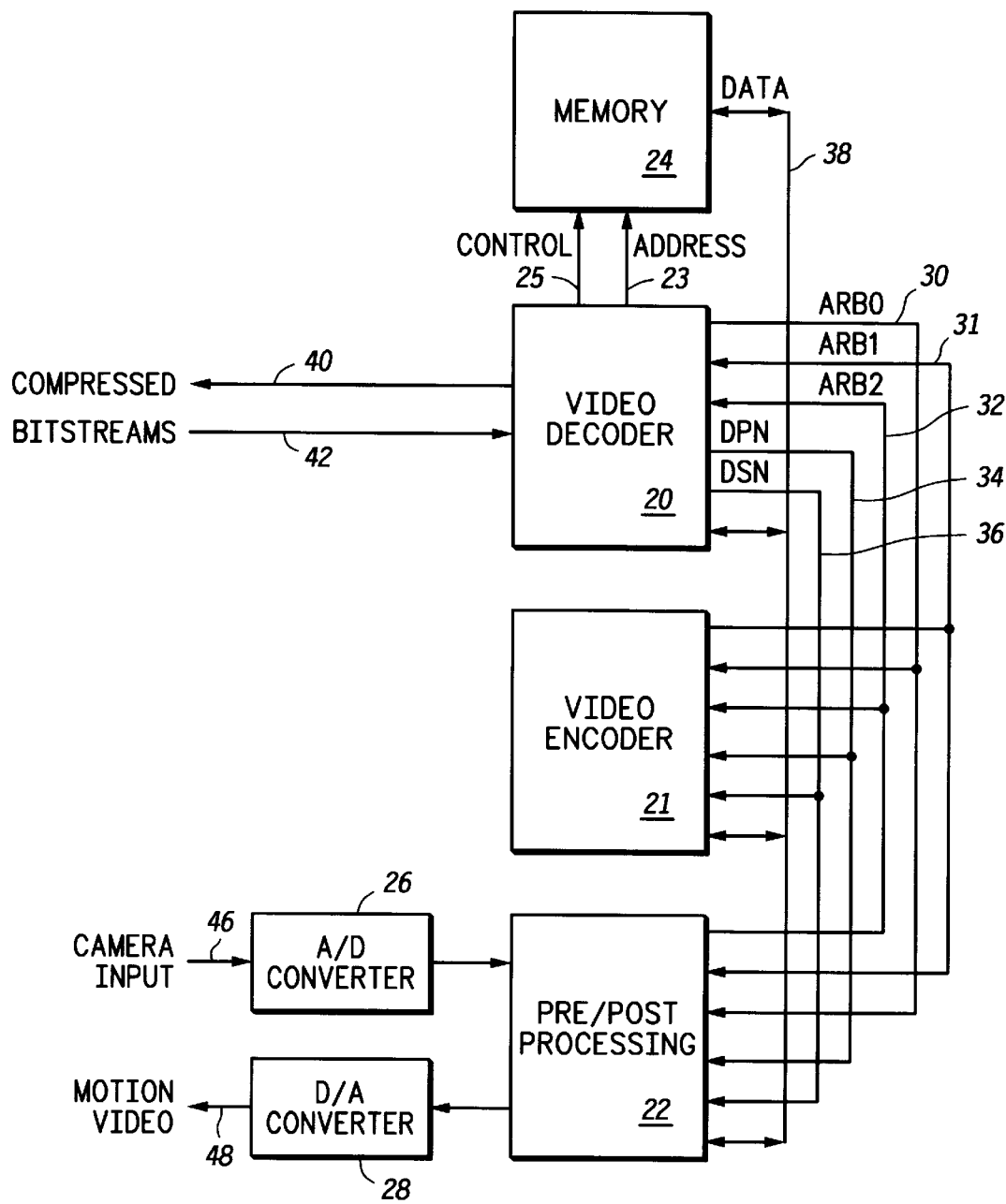
FIG. 1 is a block diagram illustrating a serial arbitration system applicable for low power applications, in accordance with the present invention.

FIG. 1 is a block diagram illustrating a serial arbitration system applicable for low power applications, in accordance with the present invention. Three processors are shown: a video decoder 20, a video encoder 21, and a pre/post processing circuit 22. Note that these are illustrative, and other processor combinations are also possible and expected with this serial arbitration system. The video decoder 20 has compressed bitstream input 42 and output 40 lines. The pre/post processing circuit 22 receives camera input 46 through an A/D converter 26, and generates motion video signals 48 through a D/A converter 28.

The three processors 20, 21, 22 are coupled via a serial data line 38. Also coupled to the data line 38 is a memory 24, controlled by the master processor, in this embodiment the video decoder 20, through address 23 and control 25 lines. The memory 24 can be any type of dynamic or static memory, including SRAM, DRAM, Flash, etc. Also coupling the three processors 20, 21, 22 are three arbitration lines: ARB0 30, ARB1 31, and ARB2 32, as well as a DPN line 34 and a DSN line 36. The serial data line 38 can be driven or written by any of the processors 20, 21, 22. The DPN line 34 and the DSN line 36 are driven by the master processor 20, and read by the other two processors 21, 22. The ARB0 30 line is driven by the first or master processor 20, and read by the other two processors 21, 22. The ARB1 31 line is driven by the second processor 21, and read by the other two processors 20, 22. The ARB2 line 32 is driven by the third processor 22 and read by the other two processors 20, 21. This arbitration system can be expanded to operate with more or fewer processors. In the preferred embodiment, up to five processors are supported.

Each arbitration (ARB) line 30, 31, 32 is connected to each processor 20, 21, 22. Thus, in a system with three processors 20, 21, 22 and three arbitration lines 30, 31, 32, each processor 20, 21, 22 has three arbitration line 30, 31, 32 connections. In all cases, the first connection is utilized by the line that a given processor is driving. For example, the first arbitration line for the first processor 20 is coupled to the ARB0 30 line. Likewise the first arbitration line for the second processor 21 is coupled to the ARB1 31 line and the first arbitration line for the third processor 22 is coupled to the ARB2 32 line.

The read side of the second and subsequent arbitration lines 31, 32, is coupled to all processors that do not drive that arbitration line 31, 32 at the connection corresponding to the processor 21, 22 driving that line. Therefore, the second arbitration line, ARB1 31, is coupled to the second connection for the first 20 and third 22 processors. Likewise, the third arbitration line, ARB2 32, is coupled to the third connection for the first 20 and second 21 processors. The first arbitration line, ARB0 30, is driven by the first output connection on the first processor 20, and is connected to the other processors 21, 22 at the arbitration connection corresponding to the processor number of the processor. Thus, the ARB0 30 line is coupled to the second input connection of the second processor 21 and the third input connection of the third processor 22. As will be seen, this wiring system provides a number of benefits, including the ability to determine a processor ID for each processor based solely upon the wiring of the processors.

Figure 3:
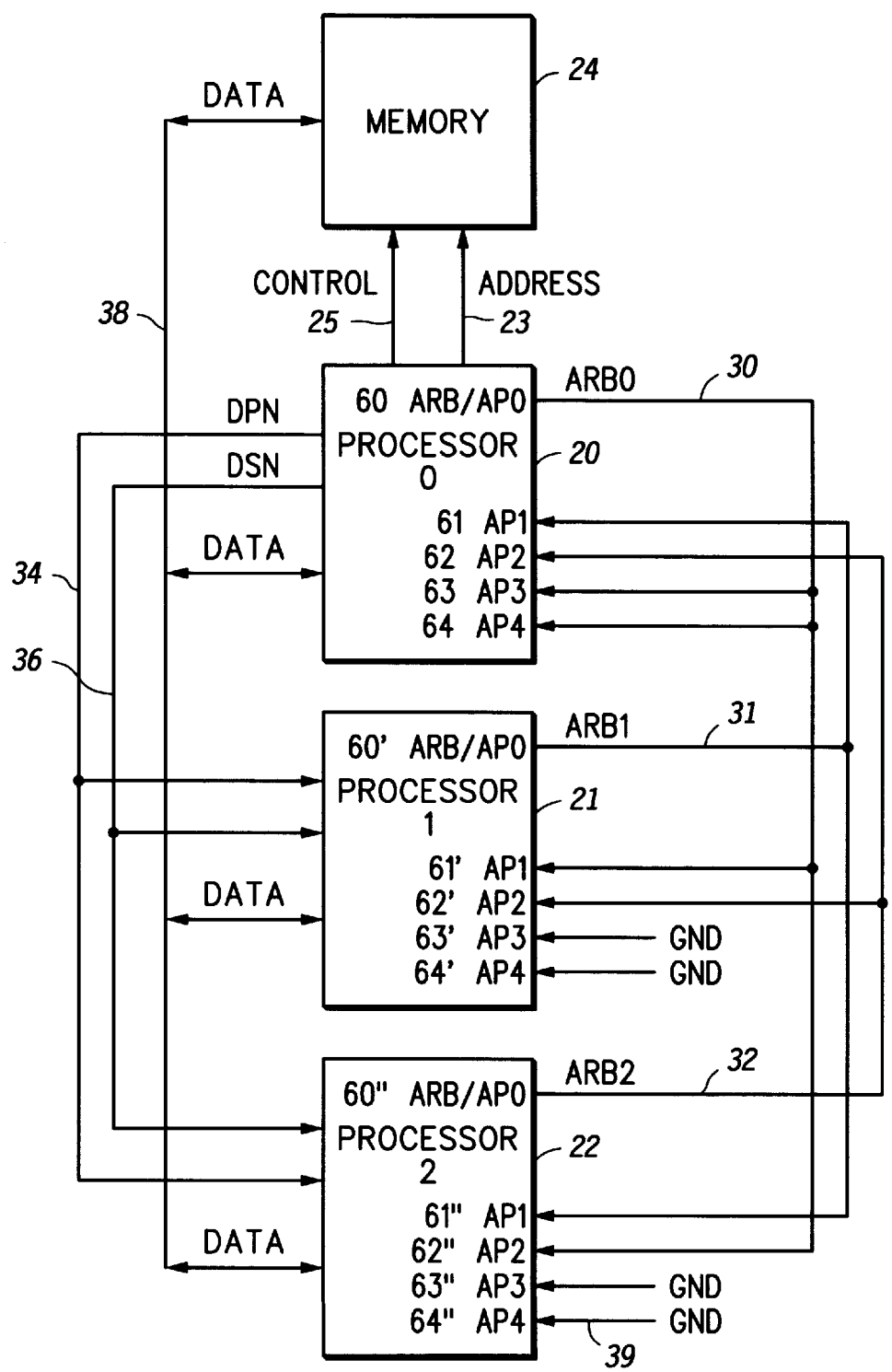
FIG. 3 is a block diagram illustrating the arbitration system shown in FIG. 1 in more detail.

FIG. 3 is a block diagram illustrating the arbitration system shown in FIG. 1 in more detail. The first arbitration line, ARB0 30, is coupled to input ports AP3 63 and AP4 64 in the first processor 20. This allows quick determination by the master processor 20 of which processors are connected in the system. In this case, the connection of ARB0 30 to input ports AP3 63 and AP4 64 will identify these ports as corresponding to unconnected processors. The AP1 61 input port is responsively coupled to the ARB1 31 arbitration line and the AP2 62 input port is responsively coupled to the ARB2 32 arbitration line. This allows the master processor 20 to identify these two lines 31, 32 as corresponding to the other two connected processors 21, 22. The master processor 20 can be identified as such because all connected input ports AP1 61 and AP2 62 are coupled to its arbitration line 31.

The second processor 21 is responsively coupled to the ARB0 30 arbitration line on port AP1 61' and to the ARB2 32 arbitration line on port AP2 62'. The coupling of the ARB0 30 line to the AP1 61' port has the effect of identifying this processor 21 with a processor ID=1. The third and fourth incoming ports, AP3 63' and AP4 64', are coupled to ground. This effectively notifies the second processor 21 that the corresponding processors are not connected to the arbitration system.

The third processor 21 is responsively coupled to the ARB0 30 arbitration line on port AP2 62" and to the ARB1 31 arbitration line on port AP1 61". The coupling of the ARB0 30 line to the AP2 62" port has the effect of identifying this processor 22 with a processor ID=2. The third and fourth incoming ports, AP3 63" and AP4 64", are coupled to ground. This effectively notifies the third processor 22 that the corresponding processors are not connected to the arbitration system.

Figure 4:
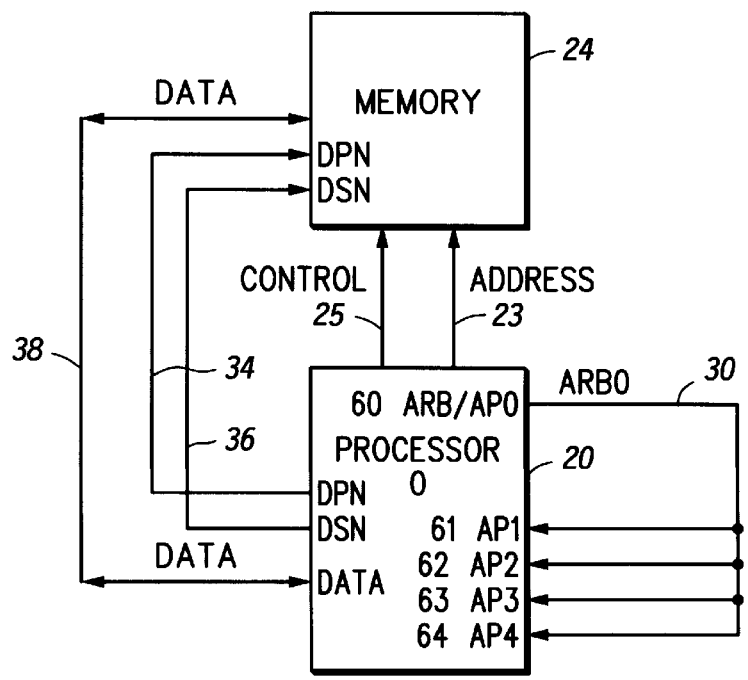
FIG. 4 is a block diagram that illustrates the special case from FIG. 3 where only a single processor is wired.

FIG. 4 is a block diagram that illustrates the special case from FIG. 3 where only a single processor 20 is wired. All input ports AP1 61, AP2 62, AP3 63, and AP4 64 are responsively coupled to the first arbitration line ARB0 30 driven from the output ARB/AP0 output port 60.

Figure 7:
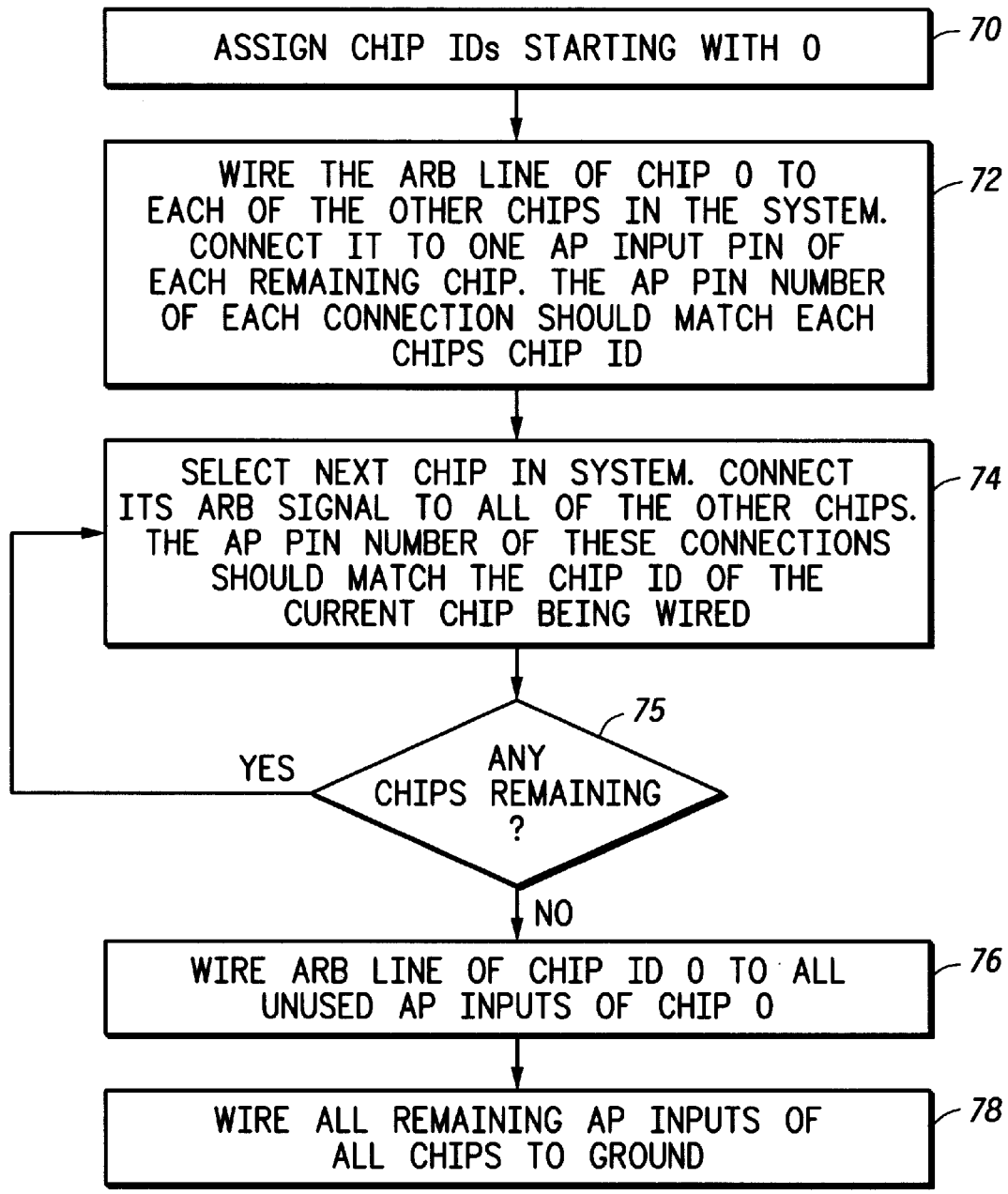
FIG. 7 is a flow chart that illustrates the algorithm for wiring processors for the serial arbitration system disclosed herein.

FIG. 7 is a flow chart that illustrates the algorithm for wiring processors for the serial arbitration system disclosed herein. Chip or processor IDs are assigned beginning at zero (0), step 70. The master processor 20 is assigned ID=0. Next, the ARB line, ARB0 30, of processor 20 with ID=0 is wired from the ARB/AP0 output port 60 to each of the other chips in the system. It is connected to the input port (AP) pin that matches the processor ID. Thus, the ARB0 30 line is connected to AP1 61 on the processor 21 with ID=1, and to AP2 62 on the processor 22 with ID=2, etc., step 72.

Next, a loop is entered. The next chip in the system is selected. Its ARB signal line 60', 61" is connected to all of the other chips in the system on the AP pin corresponding to the processor ID of the chip being wired, step 74. Thus, the ARB1 31 signal line is connected from the ARB/AP0 output pin 60' to the AP1 61 pin of the processor 20 with ID=0, and to the AP1 61" pin of the processor 22 with ID=2. A test is then made as to whether any more chips need to be wired, step 75. If more chips need to be wired, the loop is repeated, starting with step 74.

Otherwise, the wiring loop is complete, and the ARB0 30 line of the processor 20 with ID=0 is connected from its ARB/AP0 output pin 60 to each of its unused AP input pins, step 76. Then the remaining AP pins of the processors with ID≠0 are connected to ground 39, step 78. The wiring is then complete.

Figure 2:
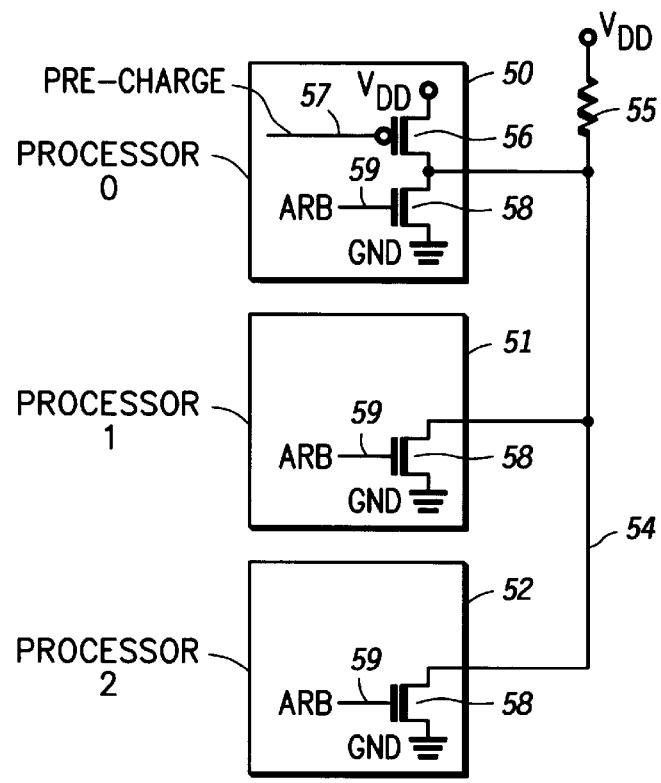
FIG. 2 is a block diagram that illustrates a prior art serial arbitration system that utilizes an open pull-down collector configuration to arbitrate between a number of devices.
Figure 5:
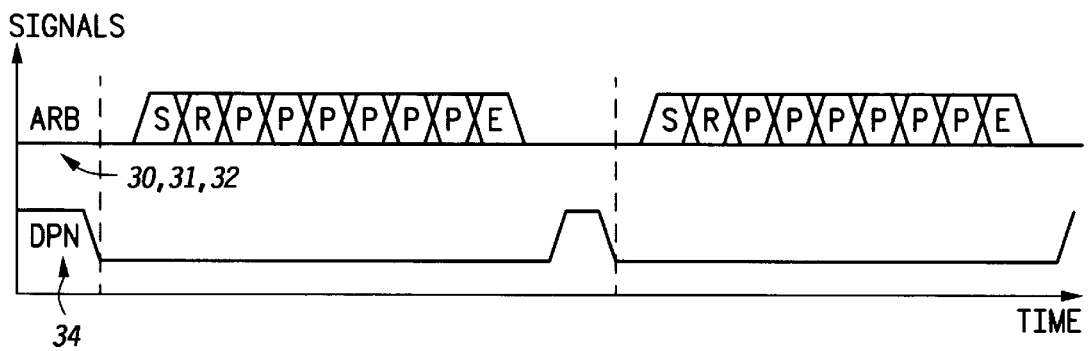
FIG. 5 is a timing diagram illustrating the serial arbitration protocol utilized by the arbitration system shown in FIGS. 2–4.

FIG. 5 is a timing diagram illustrating the serial arbitration protocol utilized by the arbitration system shown in FIGS. 2–4. A bus arbitration cycle is initiated by the master processor 20 asserting the DPN line 34 low. Each processor 20, 21, 22 will then generate a nine bit arbitration token on the corresponding arbitration line ARB0 30, ARB1 31, and ARB2 32. The function of the bits in the arbitration protocol token are illustrated in table T-1:

TABLE T-1

Serial Arbitration Protocol Token

| ID | # | Name | Value |
| --- | --- | --- | --- |
| S | 1 | Start Bit | 1 => Master 20 (ARB0 30) |
|    |   |           | 0 => Otherwise 21, 22 |
| R | 1 | Request | 1 => Requesting |
|    |   |         | 0 => Otherwise |
| P | 6 | Priority Level | binary value: 0 <= v <= 63 |
| E | 1 | Parity | XOR parity of token |

Thus, the master processor 20 (ID=0) generates a token with a start bit equal to one, while the other processors 21, 22 (ID≠0) generate tokens with a start bit equal to zero. This provides the remainder of the mechanism that allows each processor to determine both which processor it is, and which processors are currently connected to the system.

Returning to FIG. 3, the first processor 20 is able to identify the second processor 21 coupled to its first input port AP1 61 and the third processor 22 coupled to its second input port AP2 62 by their starting bit being equal to zero. A similar fourth and fifth processor are not connected to the system, as indicated by the corresponding input ports AP3 63 and AP4 64 being coupled to the first arbitration line ARB0 30, which is identified by a start bit equal to one. As the master, the first processor 20 assigns itself a processor ID=0.

The second processor 21 is able to identify and assign itself processor ID=1 because its first input port AP1 31 is responsively coupled to the first arbitration line ARB0 30 on which a start bit of one is generated. Likewise, the third processor 22 is able to identify itself and assign itself processor ID=2 because its second input port AP2 32 is responsively coupled to the first arbitration line ARB0 30 on which a start bit of one is generated.

Returning to FIG. 5, after the start bit has been sent by each processor on its corresponding ARB line, a Request Bit is transmitted. This Request Bit is set by each processor when it wants to transmit data. When more than one processor requests control at the same time, resort is made next to the Priority Bits that follow the Request Bit on each ARB line. The six Priority Bits provide a priority value for each processor in the range of 0<=Priority<=63. The Priority Bits are transmitted most significant bit first. If multiple processors request control at the same time, the processor with the highest priority coded in its Priority Bits wins the arbitration. Finally, if more than one processor request control at the same time with the same priority level requested, the processor with the lowest processor ID will win control. The Priority Bits are followed by a Parity Bit. If a processor detects a parity error on one of its incoming Arbitration Ports (AP), it drops out of the arbitration until the next round of arbitration. This provides protection to the buses in cases where arbitration data is corrupted.

Figure 6:
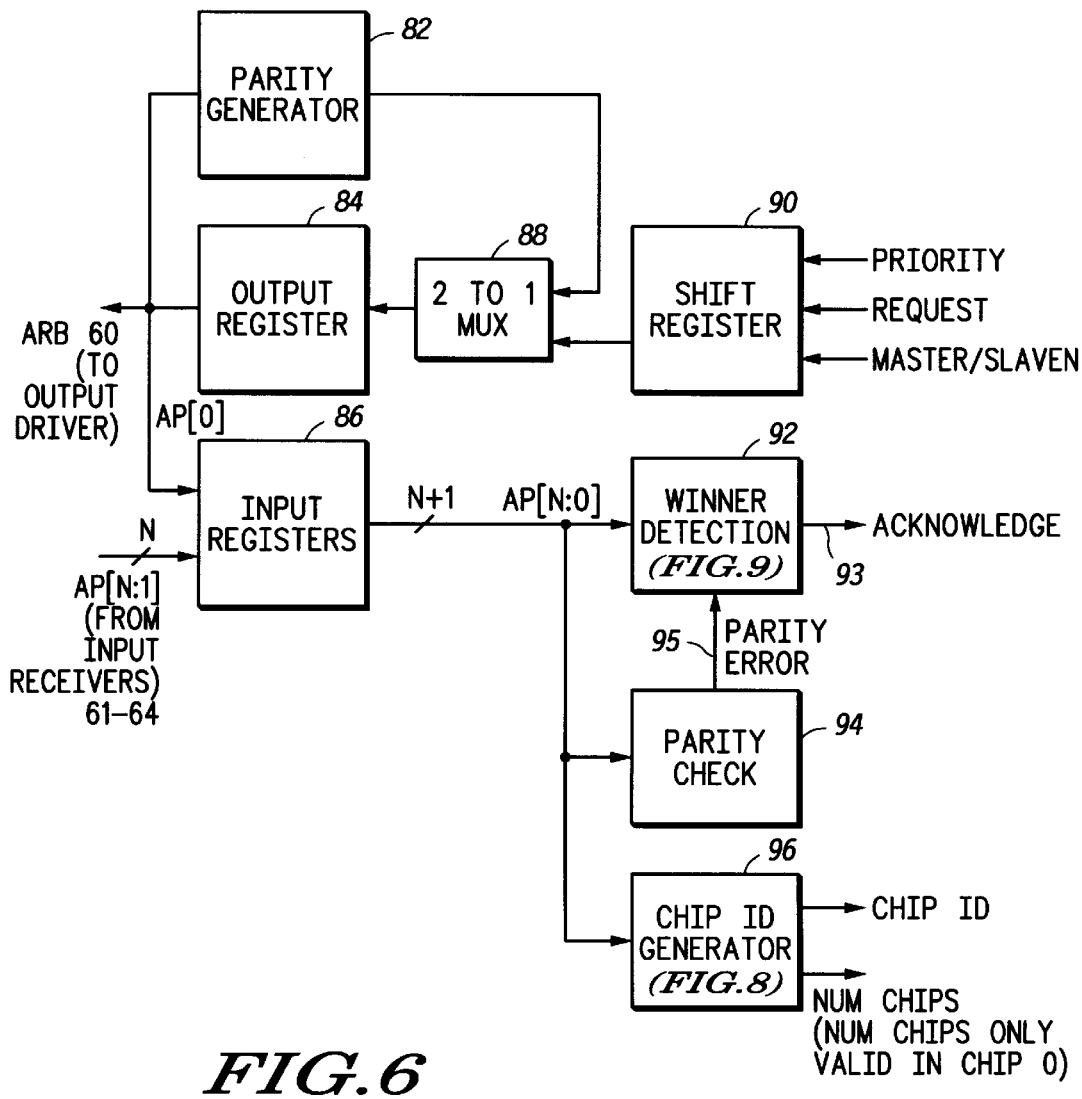
FIG. 6 is a block diagram illustrating the elements in the serial arbitration system illustrated in FIGS. 2–4.

FIG. 6 is a block diagram illustrating the elements in the serial arbitration system illustrated in FIGS. 2–4. Output is loaded into, then shifted out of an output shift register 90. This output is an eight-bit bit stream with the first bit being the start (S) bit, the second bit being the request (R) bit, and the remaining six bits being the request priority coded as a binary integer in bit major order. The format of the bits is illustrated in Table T-1. The output bits are shifted out of the output shift register 90 one bit at a time and received by a 2-1 mux 88. In normal operation, the mux 88 transmits the bit shifted out of the output shift register 90 to a one-bit output register 84. The one-bit output register 90 transmits the outgoing bit on its corresponding ARB 60 arbitration line. The one-bit output is also received by a parity generator circuit 82. The parity generator circuit 82 generates a parity result for the bits sent on the ARB line. One method for generating such an error code is to XOR each output bit received with a running XOR sum. After the eight bits have been shifted out of the output shift register 90, the result from the parity generator circuit 82 is transmitted via the 2-1 mux 88 to the one-bit output register and subsequently out on the output ARB line 60.

A set of input registers (AP[N:1]) 86 receive bits from each of the incoming arbitration (ARB) lines. Additionally, the output sent from the one-bit output register 84 to the output arbitration line is captured in another input register (AP[0]). There is thus one one-bit input register for each possible processor in the system, including one such register (AP[0]) for the processor itself.

The output of the input registers (AP) 86 is on a bus with one line for each potential processor. Receiving these register values are a winner detect circuit 92, a parity check circuit 94, and a chip ID generator 96. The operation of the winner detect circuit 92 was disclosed in FIGS. 9 and 10. The parity check circuit 94 operates similarly to the parity generator 82 discussed earlier. If the parity generator 82 is implemented using an XOR sum, the parity check circuit 94 would operate similarly, though generating the XOR sum in parallel for each input port (AP). The parity check circuit 94 generates a parity error signal that is received by the winner detection circuit 92. It is used in step 136 of FIG. 10 to force processors to drop out of the arbitration when they detect a parity error on any arbitration input line. Finally, the chip ID generator 96 implements a chip ID determination algorithm as disclosed in FIG. 8.

Figure 8:
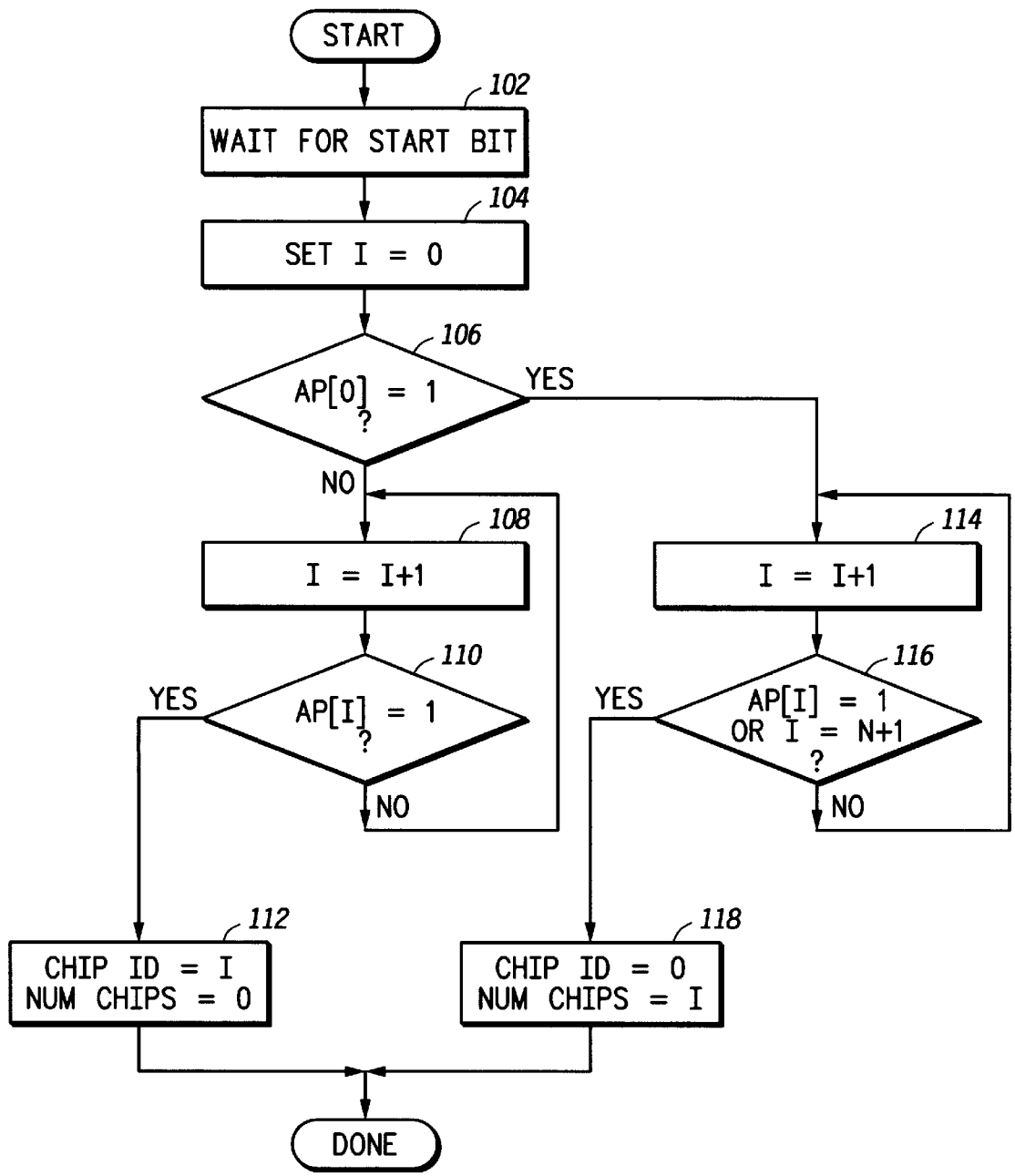
FIG. 8 is a flow chart that illustrates an algorithm for Chip Id Generation in FIG. 6.

FIG. 8 is a flow chart that illustrates an algorithm for Chip Id Generation 96 (FIG. 6) used to determine both the ID of each processor and the number of processors connected. It starts by waiting for a start bit, step 102. As noted above, a start bit is generated on each ARB line 30, 31, 32 in response to assertion of the DPN line 34 by the master processor 20. An index (I) is then initialized to zero, step 104. A test is made whether the start bit for the (ARB) AP[0] serial arbitration line is one (1) or zero (0), step 106. If the start bit is equal to one, the processor is the master processor 20.

Otherwise, a loop is entered. The index (I) is incremented, step 108. A test is then made of the input arbitration port (AP) corresponding to the index (AP[I]), step 110. If the start bit for that arbitration port is not equal to one (1⁻), the loop is repeated, starting with step 108. When a start bit for an arbitration port (AP[I]) is found to be equal to one (1), step 110, the loop is complete, since this indicates that the arbitration port (AP[I]) is connected to the ARB0 30 line. In this case, the processor ID is set to the index (I), and the number of chips set to zero, step 112.

Otherwise, when the (ARB) AP[0] arbitration port has a start bit equal to one (1), step 106, a loop is entered the index (I) is incremented, step 114. A test is then made whether the arbitration Port (AP[I]) corresponds to the index (I), step 116. If the start bit of the arbitration port (AP[I]) corresponding to the index is not equal to one (1), and the index (I) is less than the maximum number of processors in the arbitration system, step 116, the loop repeats, starting with incrementing the index (I), step 114. Otherwise, the processor ID is set equal to zero and the number of processors is set equal to the index (I), step 118, and the algorithm is complete.

Figure 9:
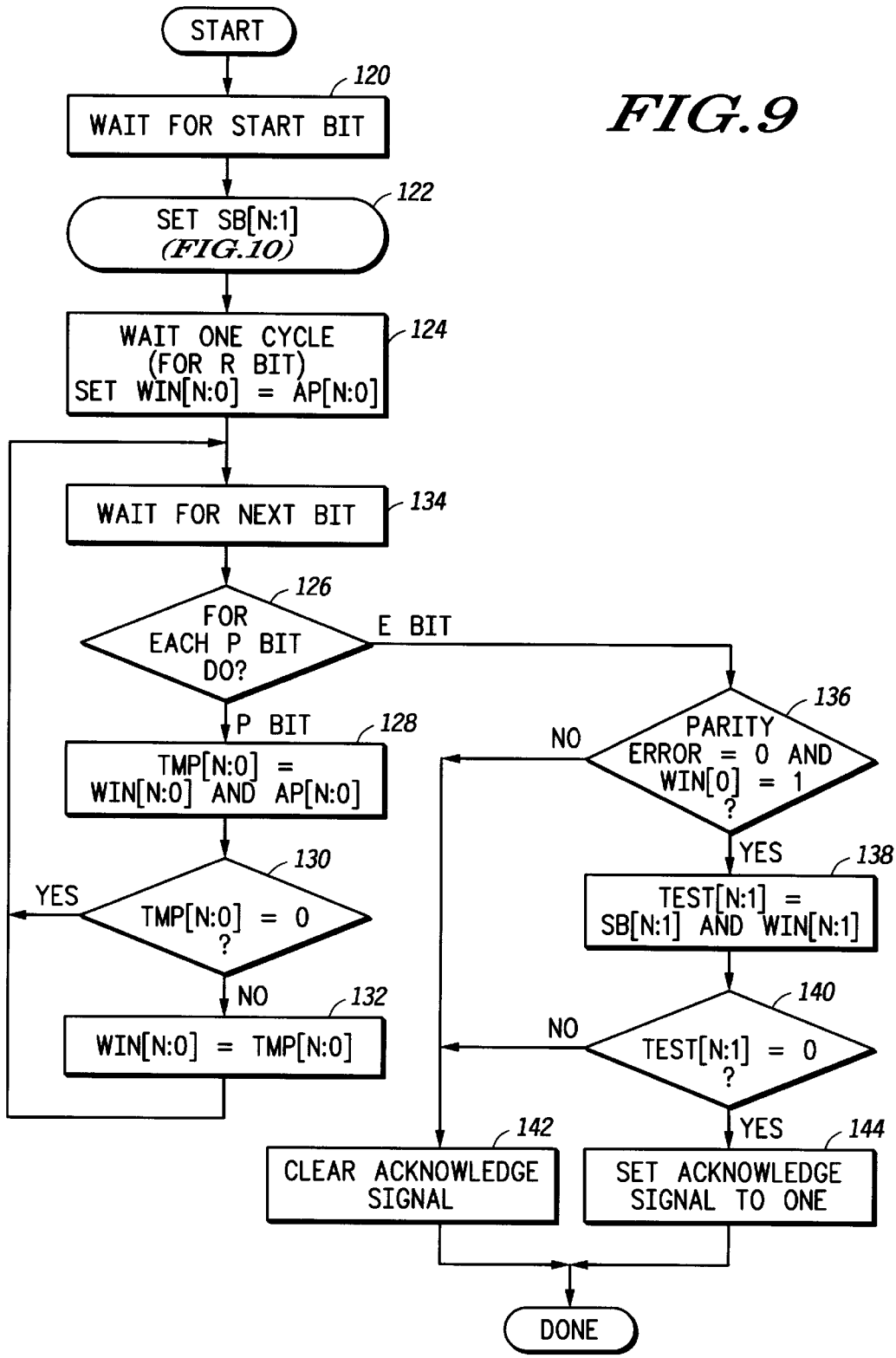
FIG. 9 is a flow chart illustrating an algorithm for arbitration winner detection in FIG. 6.

FIG. 9 is a flow chart illustrating an algorithm for arbitration winner detection 92 (see FIG. 6). After starting, for example when the DPN signal 34 is asserted, a wait is made for a start bit, step 120. A start bit (SB) mask is formed based on the processor ID, step 122. This step is more fully described in FIG. 10. In this illustration, the Start Bit Mask (SB) mask is formed based on start bits just received. However, it is possible to save the Start Bit Mask (SB) mask, and only rebuild it when a processor is added or dropped. At this point, the method waits one cycle, until the Request Bit is received on all Arbitration Ports (AP). A WIN bit vector is set equal to the Arbitration Port (AP) bit vector, step 124. This WIN bit vector indicates which processors are currently winning the arbitration. It is initialized to indicate those processors that are requesting control.

A loop is then entered. A wait is made for the next bits to be clocked into each of the input ports and registered in the corresponding AP bit vector registers, step 134. A test is then made whether the bits just received were priority (P) bits or error (E) bits, step 126. For each Priority (P) bit received, step 126, a TMP bit vector is set to the logical product of the WIN bit vector AND the Arbitration Port (AP) bit vector, step 128. A test is then made whether the TMP bit vector is zero, step 130. If the TMP bit vector is not zero, step 130, the WIN bit vector is set equal to the TMP bit vector, step 132. In either case, the loop repeats until the parity (E) bit is encountered, starting with step 134. The importance of transmitting the priority (P) bits most significant bit first become readily apparent here. It allows a bit by bit parallel determination of winning priority, without the necessity of accumulating each priority value.

Once the parity (E) bits are encountered, the parity of each port is tested against the corresponding parity (E) bits. This can be done by XORing each input bit in the Arbitration Port (AP) bit vector with a running PARITY bit vector as it is received. After receiving the final parity bit (E), the PARITY bit vector should contain either all one bits or all zero bits, depending on whether odd or even parity is used. If it doesn't contain the expected sum, a parity error was detected on one of the Arbitration lines, and a parity error signal 95 is asserted by the parity check circuit 94. If either a parity error is detected, or the processor performing the arbitration testing is not a potential winner, step 136, an arbitration acknowledge signal 93 is negated, step 142. The test for a processor being a potential winner is performed by testing the first location in the WIN bit vector (WIN[0]) for being not equal to zero.

Otherwise, if both no parity error was detected, and the processor is a potential winner, step 136, a TEST bit vector is set equal to the logical product of the Starting Bit (SB) bit vector AND the WIN bit vector, step 138. If the remaining bit in the TEST bit vector are not equal to zero, step 140, another processor won the arbitration, and the request acknowledge signal is cleared, step 142. Otherwise, the arbitration acknowledge signal 93 is asserted, step 144, indicating that the processor has won control of the arbitrated resources.

Figure 10:
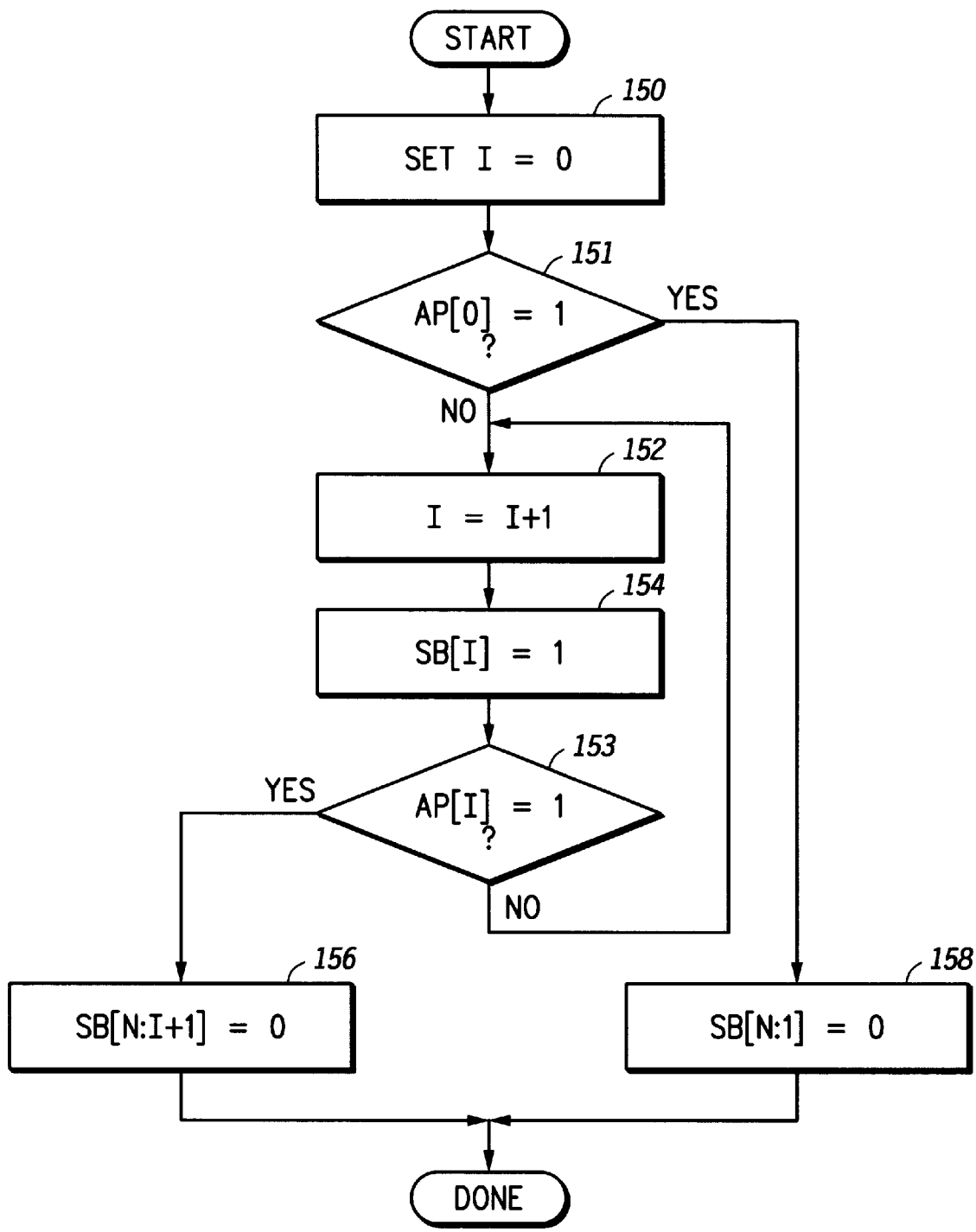
FIG. 10 is a flow chart illustrating formation of a Start Bit Mask (SB) bit vector, as shown in step 122 of FIG. 9.

FIG. 10 is a flow chart illustrating formation of a Start Bit Mask (SB) bit vector, as shown in step 122 of FIG. 9. First, an index (I) is set to zero, step 150. A test is then made whether the start bit for the first Arbitration Port (AP) is set, step 151. If the AP[0] start bit is set, the processor is the master processor. In that case, the first element in the Start Bit Mask (SB) bit array is set to one (1), and the remainder of the bits in the Start Bit Mask (SB) bit array are set to zero (0), step 158.

Otherwise, when the first AP[0] start bit is equal to zero (0), step 151, a non-master processor is involved, and a loop is entered. The first element in the Start Bit Mask (SB) bit vector (SB[0]) is set to one (1) and the index (I) is incremented, step 152. The corresponding Start Bit Mask (SB) bit vector (SB[I]) is set to one (1), step 154. A test is then made whether the start bit of the Arbitration Port (AP[I]) corresponding to the index (I) is set, step 153. If not set, step 153, the loop repeats starting at step 152. Otherwise, once the Arbitration Port (AP[I]) corresponding to the index (I) is identified, step 153, the remainder of the bits in the Start Bit Mask (SB) bit vector (SB[N:I+1]) are cleared, step 156. In all cases the algorithm is then complete.

Note what happens here. In the case of the master processor 20, the Start Bit Mask (SB) bit vector is established that contains a one bit in the first position (corresponding to itself), and a zero bit thereafter. In the case of other processors, the Start Bit Mask (SB) bit vector is established so that a bit is set in that bit vector for each processor with a lower processor ID. In the case of non-master processors, the Start Bit Mask (SB) bit vector then contains a bit for each processor that can potentially beat this processor should they tie as to priority. The master processor, with ID=0, always wins arbitrations with the same priority.

Figure 11:
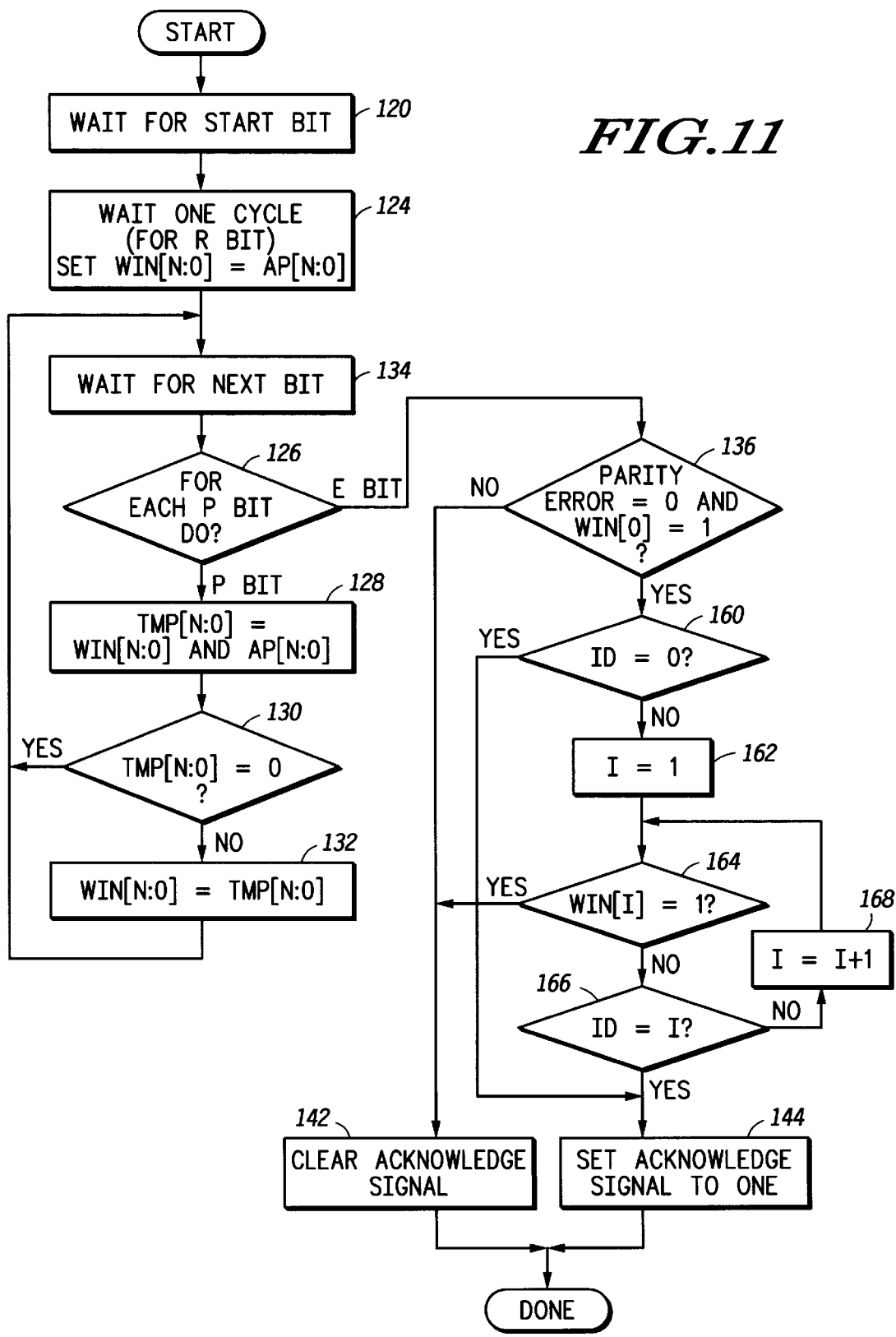
FIG. 11 is a flowchart illustrating an alternate embodiment of the algorithm for arbitration winner detection illustrated in FIG. 9.

FIG. 11 is a flowchart illustrating an alternate embodiment of the algorithm for arbitration winner detection 92 illustrated in FIG. 9. It begins by waiting for a start bit, step 120. The start bits may be stored from the input AP bit array into a Start Bit Mask (SB) bit array for use in steps 160 and 166 below (not shown). Then a wait is made for the Request (R) bit, and thence a WIN bit array is set equal to the AP bit array, step 124 containing the request (R) bits for each of the processors. A loop is then entered, and the next bit is awaited, step 134. Once the bits have arrived, and have been registered in the AP bit array register, a test is made whether priority (P) bits or the error (E) bits have been received, step 126. Currently, six priority (P) bits are clocked in on each input port, before the error (E) bits are received. If priority (P) bits have been received, step 126, a TMP bit array is set equal to the logical product of the WIN bit array AND the AP bit array containing the priority (P) bits, step 128. The TMP bit array is then tested, step 130, and if not equal to zero, the WIN bit array is set equal to the TMP bit array, step 132. In either case, regardless of whether the TMP bit array is zero, step 130, the loop repeats, starting at step 134.

Once the E bits have been clocked into the AP bit registers, a test is made whether a parity error was detected, and whether the processor could be an arbitration winner, step 136. This later test is performed by testing whether the WIN[0] bit has a nonzero value. If either a parity error signal 95 was received from the parity check hardware 94, or the processor cannot win the arbitration, step 136 because the WIN[0] bit is not set, the arbitration acknowledgment signal 93 is negated, step 142. Otherwise, a test is made whether this is the master processor (with ID=0), step 160. One method is to do this by testing the processor ID. An alternative method is to test the first Start Bit Mask (SB[0]), if previously retained. Since the master processor (ID=0) wins all arbitrations, the arbitration acknowledge signal 93 is asserted, step 144.

When not the master processor (ID≠0), step 160, an index (I) is set equal to one (1), step 162. A loop is then entered, which first tests whether the corresponding WIN bit array entry (WIN[I]) is set, step 164. If the corresponding WIN bit array entry is set, step 164, a lower numbered processor has won the arbitration, and the arbitration acknowledge signal 93 is negated, step 142. Otherwise, a test is made whether this input port corresponds to the master processor 20, step 166. This can be done by testing the index (I) against the processor ID. An alternative is to test whether the corresponding Start Bit Mask (SB[I]), if previously retained, is not equal to zero. If this was the master processor 20, with an index (I) equal to the processor ID, step 166, no more processors need to be tested, since the remaining processors have higher processor IDs, and thus this processor wins the arbitration. In that case, the arbitration acknowledge signal 93 is asserted, step 144. Otherwise, the index (I) is incremented, step 168, and the loop repeated, starting with step 164. Finally, when the arbitration acknowledge signal 39 is either asserted, step 144, or negated, step 142, the method is complete.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. An arbitration circuit for controlling access through arbitration to a shared data bus shared by a plurality of processors coupled by a corresponding plurality of arbitration lines, said arbitration circuit comprising:

a plurality of arbitration registers that register arbitration port traffic, each of the plurality of arbitration registers corresponding to one of the corresponding plurality of arbitration lines;

a plurality of ports to communicate data over the shared data bus;

a winner detection circuit responsively coupled to each of the plurality of arbitration registers and providing an arbitration acknowledge signal that controls write access to the shared data bus based on a determination of winning an arbitration; and a protocol error detection circuit responsively coupled to each of the plurality of arbitration registers to provide an error detected signal when an error is detected from at least one of the plurality of arbitration registers, wherein:

the winner detection circuit is responsively coupled to the error detected signal, and the winner detection circuit denies write access to the shared data bus in response to receiving the error detected signal from the protocol error detection circuit.

2. The arbitration circuit in claim 1 wherein:

the protocol error detection circuit detects a parity error on one of the plurality of arbitration lines by applying a running XOR to each bit received from each of the plurality of arbitration lines.

3. The arbitration circuit in claim 1 which further comprises:

a chip identification generator that dynamically generates a chip identification (ID) for a processor containing the arbitration circuit.

4. The arbitration circuit in claim 1 which further comprises:

an arbitration output register which receives single bits to transmit on an arbitration output line, and provides an input to one of the plurality of arbitration registers.

5. The arbitration circuit in claim 4 which further comprises:

a parity generator to generate a parity bit based on a plurality of output bits transmitted on the arbitration output line.

6. The arbitration circuit in claim 5 which further comprises:

an output shift register that sequentially provides through shifting a plurality of output bits for output to the arbitration output line; and a MUX responsively coupled to the parity generator and the output shift register and providing the input to the arbitration output register.

7. The arbitration circuit in claim 1 wherein an operation of the winner detection circuit comprises:

A) receiving one bit from each of the plurality of arbitration registers into a first bit array;

B) initializing a second bit array to be equal to the first bit array;

C) receiving one bit from each of the plurality of arbitration registers into a third bit array;

D) setting a fourth bit array equal to a logical product of the second bit array AND the third bit array;

E) setting the second bit array equal to the fourth bit array if the fourth bit array is not equal to zero;

F) repeating steps (C), (D), and (E) as a loop while a specified number of request bits are received; and G) selectively asserting the arbitration acknowledge signal based on which bits are set in the fourth bit array after exiting the loop.

8. The arbitration circuit in claim 7 wherein the operation of the winner detection circuit further comprises:

H) receiving one bit from each of the plurality of arbitration registers into a fifth bit array;

I) computing parity in an error bit array for each of the plurality of arbitration ports;

J) determining whether an error occurred from the error bit array and the fifth bit array; and K) negating the arbitration acknowledge signal to deny write access to the shared bus if an error is indicated for any of the plurality of arbitration lines.

9. A method of arbitrating access to a shared bus between a plurality of processors utilizing a serial arbitration protocol on a corresponding plurality of serial arbitration lines coupling the plurality of processors, said method comprising:

A) receiving a fixed number of start bits into a first bit array from a corresponding fixed number of arbitration ports;

B) determining a set of higher priority processors from the first bit array;

C) receiving a fixed number of request bits into a second bit array from the corresponding fixed number of arbitration ports;

D) initializing a third bit array to be equal to the second bit array;

E) receiving a fixed number of priority bits into a fourth bit array from the corresponding fixed number of arbitration ports;

F) setting a fifth bit array equal to a logical product of the third bit array AND the fourth bit array;

G) setting the third bit array equal to the fifth bit array if the fifth bit array is not equal to zero;

H) repeating steps (E), (F), and (G) as a loop while six (6) request bits are received;

I) receiving the fixed number of error bits into a sixth bit array from the corresponding fixed number of arbitration ports;

J) computing a parity in an error bit array for each of the corresponding fixed number of arbitration ports;

K) determining whether an error occurred utilizing the error bit array; and

L) selectively asserting an arbitration acknowledge signal to control a write access to the shared bus based on which bits are set in the fifth bit array after exiting the loop and whether an error occurred.

10. A method of arbitrating access to a shared bus between a plurality of processors utilizing a serial arbitration protocol on a corresponding plurality of serial arbitration lines coupling the plurality of processors, said method comprising:

A) receiving a fixed number of request bits into a first bit array from a corresponding fixed number of arbitration ports;

B) receiving a fixed number of priority bits into a second bit array from the corresponding fixed number of arbitration ports;

C) setting a third bit array equal to a logical product of the first bit array AND the second bit array;

D) setting the first bit array equal to the third bit array if the third bit array is not equal to zero;

E) repeating steps (B), (C), and (D) as a first loop while a specified number of request bits are received; and F) selectively asserting an arbitration acknowledge signal to control a write access to the shared bus based on which bits are set in the third bit array after exiting the first loop.

11. The method in claim 10 which further comprises:

G) receiving the fixed number of start bits into a fourth bit array from the corresponding fixed number of arbitration ports.

12. The method in claim 10 wherein:

the first loop is repeated six times to process a series of six priority bits.

13. The method in claim 10 which further comprises:

G) receiving the fixed number of error bits into a fourth bit array from the corresponding fixed number of arbitration ports; and H) computing parity in an error bit array for each of the corresponding fixed number of arbitration ports;

I) determining whether an error occurred from the error bit array and the fourth bit array; and J) negating the arbitration acknowledge signal to deny the write access of the shared bus if an error is indicated for any of the corresponding fixed number of arbitration ports.

14. The method in claim 11 wherein step (G) comprises:

1) determining whether an identified processor utilizing the method is a potential winner by testing a specified bit in the first bit array corresponding to the identified processor;

2) setting a fifth bit array equal to a logical product of the fourth bit array AND the first bit array;

3) determining whether one of a set of higher priority processors is a potential arbitration winner by testing a set of bits in the fifth bit array corresponding to each of the set of higher priority processors;

4) asserting the arbitration acknowledge signal if the identified processor is determined to be a potential arbitration winner in substep (1) and if none of the set of higher priority processors is determined to be a potential arbitration winner in substep (3), and 5) negating the arbitration acknowledge signal if either the identified processor is not determined to be a potential arbitration winner in substep (1) or at least one of the set of higher priority processors is determined to be a potential arbitration winner in substep (3).

15. The method in claim 14 wherein:

each of the plurality of processors is assigned a unique integer as a processor identification number, and the set of higher priority processors contains each of the plurality of processors having a processor identification number lower than a processor identification number for the identified processor.

16. The method in claim 10 wherein step (F) comprises:

1) determining whether an identified processor utilizing the method is a potential winner by testing a specified bit in the second bit array corresponding to the identified processor;

2) determining whether one of a set of higher priority processors is a potential arbitration winner by testing each of a set of bits in the second bit array corresponding to each of the set of higher priority processors;

3) asserting the arbitration acknowledge signal if the identified processor is determined to be a potential arbitration winner in substep (1) and if none of the set of higher priority processors is determined to be a potential arbitration winner in substep (2), and 4) negating the arbitration acknowledge signal if either the identified processor is not determined to be a potential arbitration winner in substep (1) or at least one of the set of higher priority processors is determined to be a potential arbitration winner in substep (2).

17. The method in claim 16 wherein substep (2) of step (F) comprises a second loop incrementing through each of the set of higher priority processors as a selected processor testing a bit in the second bit array corresponding to the selected processor each iteration through the second loop.

18. An apparatus for controlling access to a bus shared by a plurality of processors that are coupled to the bus by a plurality of arbitration lines, said apparatus comprising:

a plurality of arbitration registers to register arbitration port traffic, each of the plurality of arbitration registers corresponding to one of the plurality of arbitration lines;

a winner detection circuit responsive to each of the plurality of arbitration registers to provide an arbitration acknowledge signal that controls access to the bus based on an arbitration determination;

an arbitration output register to transmit data including a plurality of priority level bits and a parity bit on an arbitration output line, the arbitration output register coupled to an input of at least one of the plurality of arbitration registers;

a parity generator to generate the parity bit based on a plurality of output bits to be transmitted on the arbitration output line; and a parity check module responsive to at least one of the plurality of arbitration registers and coupled to the winner detection circuit, the winner detection circuit negating the arbitration acknowledge signal and thereby denying access to the bus in response to receiving a parity error signal from the parity check module for an arbitration cycle associated with a first bus access on which an error occurs to block further processing of data corresponding to the parity error.

19. The apparatus of claim 18, wherein the transmit data further includes a start bit and a request bit.

20. The apparatus of claim 18, further comprising a multiplexer responsive to the parity generator, the multiplexer coupled to the arbitration output register.

21. The apparatus of claim 20, further comprising a shift register coupled to the multiplexer.

22. The apparatus of claim 18, further comprising a chip identification generator responsive to at least one of the plurality of arbitration registers, the chip identification generator programmed to dynamically generate a chip identification.

23. The arbitration circuit of claim 18, wherein the priority level bits indicate a priority value for each of the plurality of processors.

24. The arbitration circuit of claim 23, wherein the arbitration determination is made based on the priority level bits.

25. An arbitration circuit for controlling access through arbitration to a shared bus shared by a plurality of processors coupled by a corresponding plurality of arbitration lines, said circuit comprising:

a plurality of arbitration registers that register arbitration port traffic, each of the plurality of arbitration registers corresponding to one of the corresponding plurality of arbitration lines; and a winner detection circuit responsively coupled to output from each of the plurality of arbitration registers and providing an arbitration acknowledge signal that controls write access to the shared bus based on a determination of winning an arbitration;

wherein an operation of the winner detection circuit comprises:

(A) receiving one bit from each of the plurality of arbitration registers into a first bit array;

(B) initializing a second bit array to be equal to the first bit array;

(C) receiving one bit from each of the plurality of arbitration registers into a third bit array;

(D) setting a fourth bit array equal to a logical product of the second bit array AND the third bit array;
(E) setting the second bit array equal to the fourth bit array if the fourth bit array is not equal to zero;
(F) repeating steps (C), (D), and (E) as a loop while a specified number of request bits are received; and
(G) selectively asserting the arbitration acknowledge signal based on which bits are set in the fourth bit array after exiting the loop.

26. The arbitration circuit in claim 25 wherein the operation of the winner detection circuit further comprises:

(H) receiving one bit from each of the plurality of arbitration registers into a fifth bit array from the corresponding fixed number of arbitration ports; and
(I) computing parity in an error bit array for each of the plurality of arbitration ports;
(J) determining whether an error occurred from the error bit array and the fifth bit array; and
(K) negating the arbitration acknowledge signal to deny write access to the shared bus if an error is indicated for any of the plurality of arbitration ports.

* * * * *